United States Patent [19]

Yamada

[11] Patent Number: 5,027,224
[45] Date of Patent: Jun. 25, 1991

[54] IMAGE COMMUNICATION SYSTEM
[75] Inventor: Takahiro Yamada, Ichikawa, Japan
[73] Assignee: Aisin Seiki K.K., Tokyo, Japan
[21] Appl. No.: 247,563
[22] Filed: Sep. 22, 1988
[30] Foreign Application Priority Data Sep. 24, 1987 [JP] Japan .................................. 62-239800

[51] Int. Cl.⁵ .............................................. H04N 1/32
[52] U.S. Cl. ..................................... 358/434; 358/476; 358/498
[58] Field of Search ............... 358/256, 257, 405, 400, 358/448, 452, 402, 403, 435, 439, 440, 476, 434, 498; 355/202; 271/3.1

[56] References Cited

U.S. PATENT DOCUMENTS

| | | | |
|---|---|---|---|
| 4,231,069 | 10/1980 | Wellendorf et al. ................. | 358/256 |
| 4,494,862 | 1/1985 | Tanaka .................. | 355/202 |
| 4,495,521 | 1/1985 | Nagoh .................... | 358/256 |
| 4,544,148 | 10/1985 | Kitajima et al. ..................... | 271/3.1 |
| 4,558,374 | 12/1985 | Kurata et al. ........................ | 358/257 |
| 4,701,810 | 10/1987 | Ikemoto et al. ..................... | 358/476 |

Primary Examiner—Edward L. Coles, Sr.
Assistant Examiner—Thomas D. Lee
Attorney, Agent, or Firm—Sughrue, Mion, Zinn, Macpeak & Seas

[57] ABSTRACT

In a facsimile equipment, a discharge tray on which a received hard copy is discharged is used in common as a receptacle for an original to be transmitted also. In a replay mode, additional information is entered on the received hard copy, which is then read as an original for a re-transmission to a mating facsimile equipment. A position coordinate entry unit is disposed on the common tray so that when a position of a selected item on the received hard copy is depressed, the position coordinate entry unit is effective to read such position to enable a receiving recorder to enter a given mark on the received hard copy at such position as additional information. In this manner, the use of a writing instrument to enter additional information can be dispensed with.

5 Claims, 15 Drawing Sheets

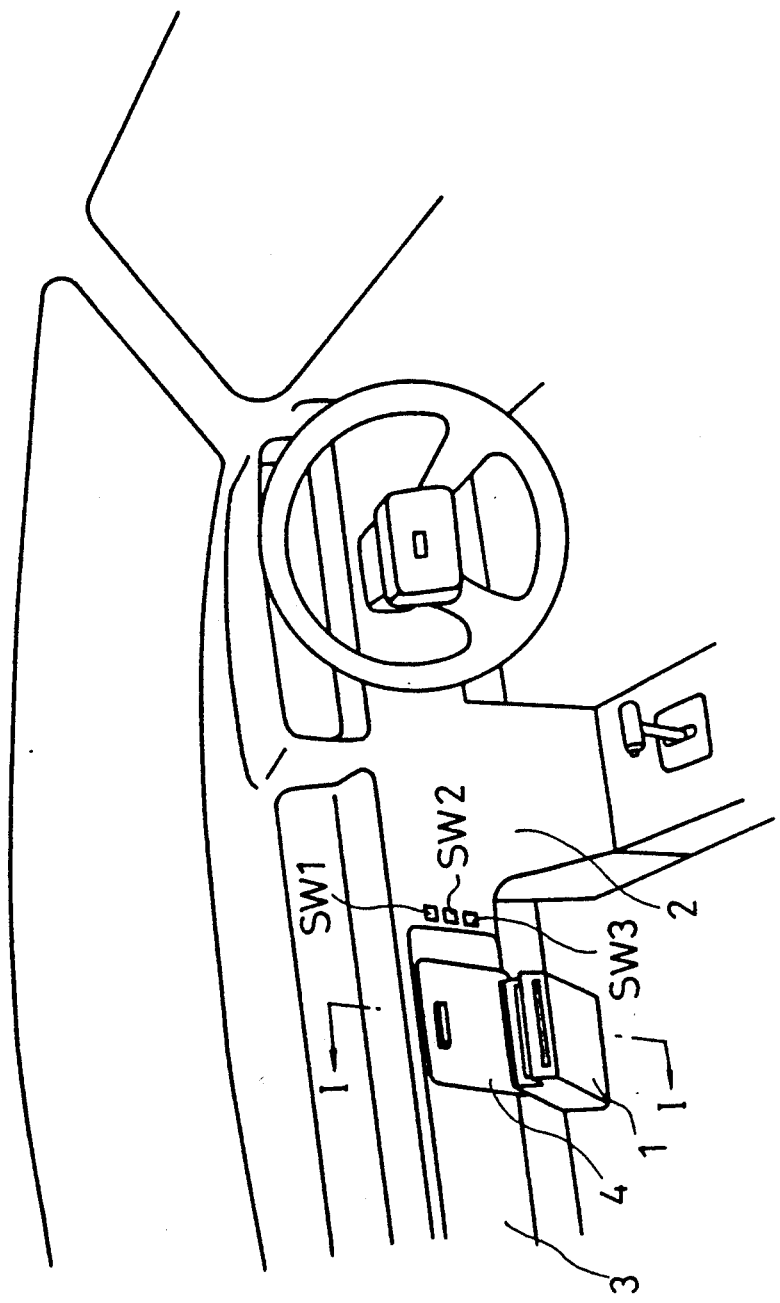

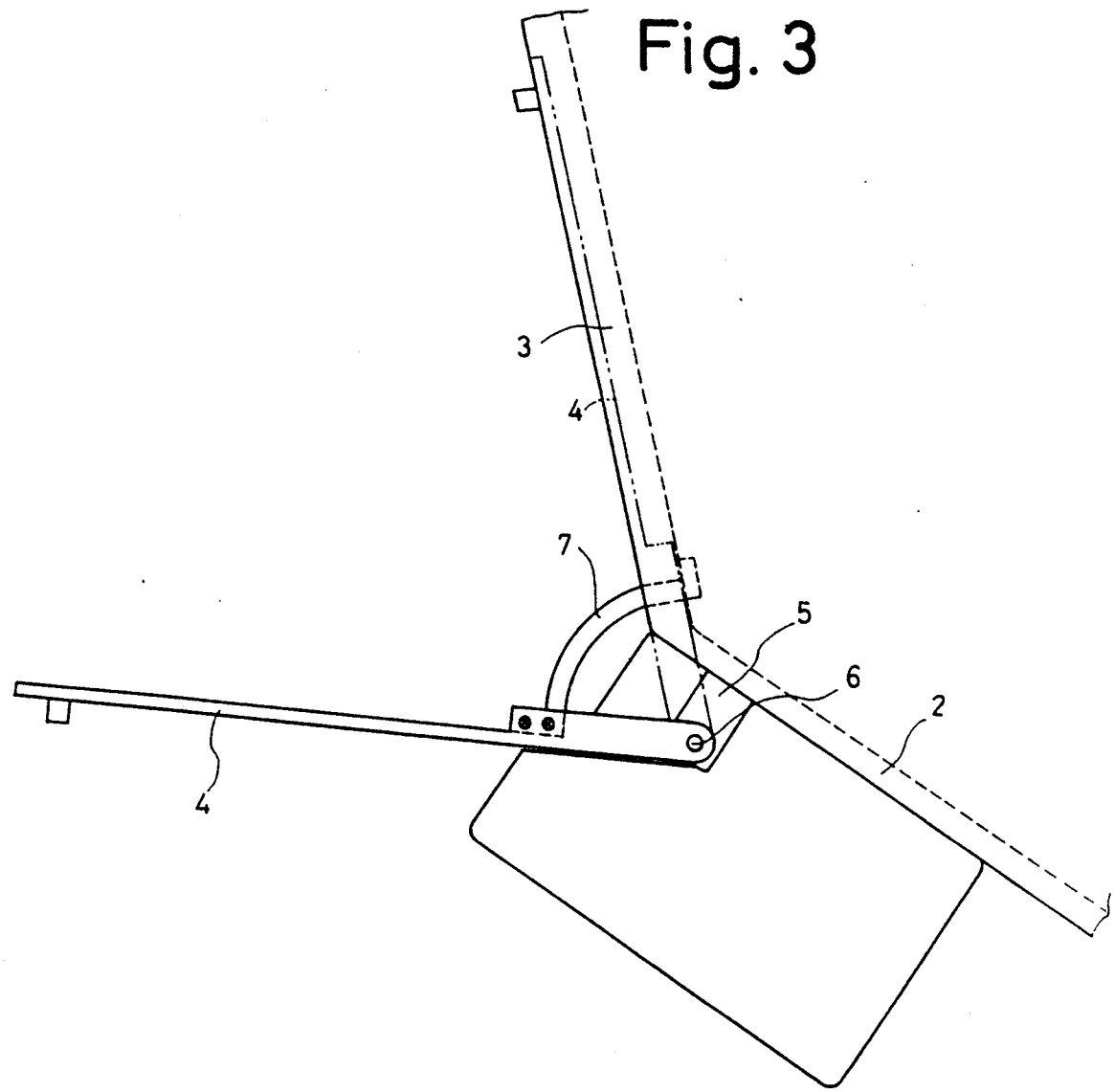

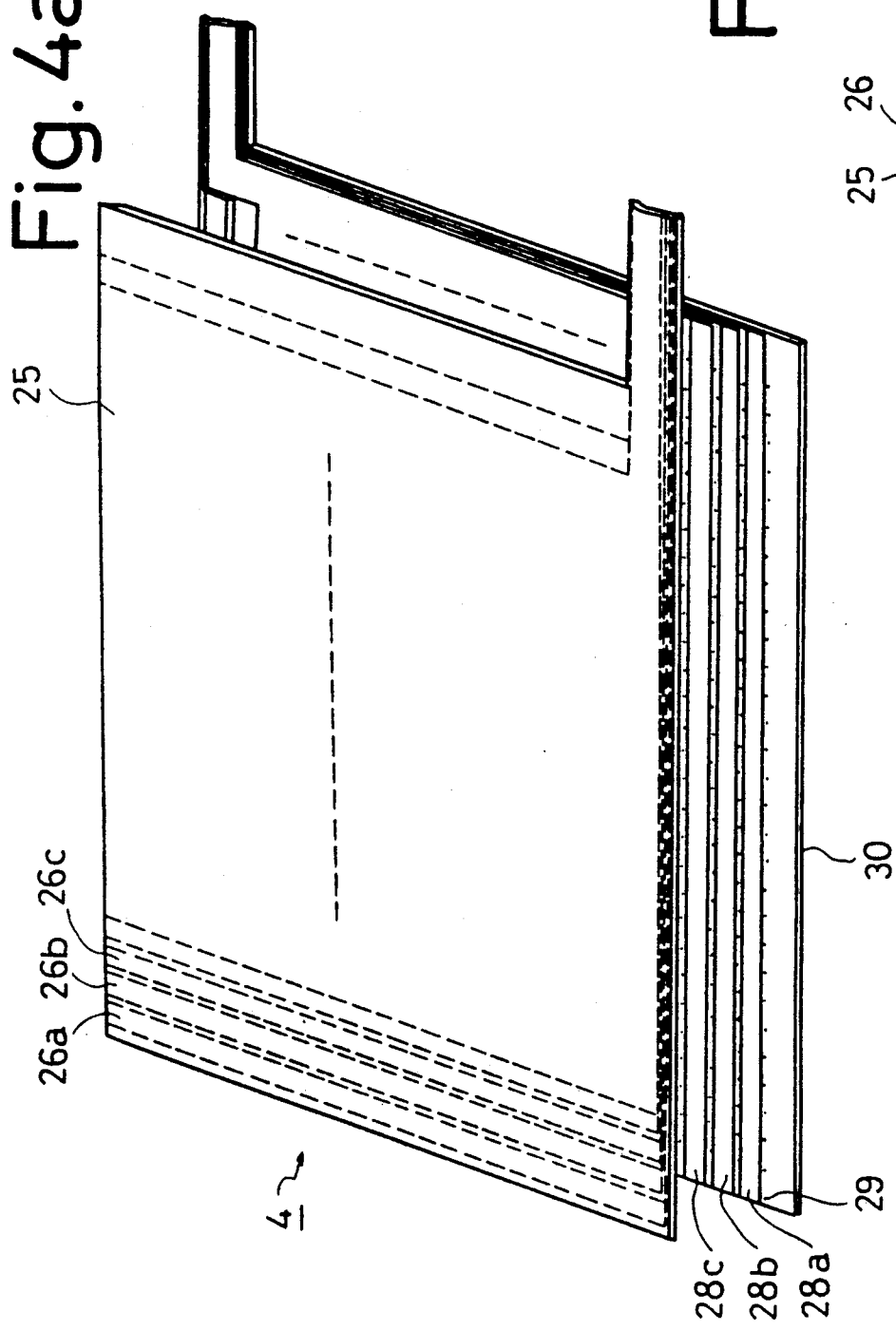
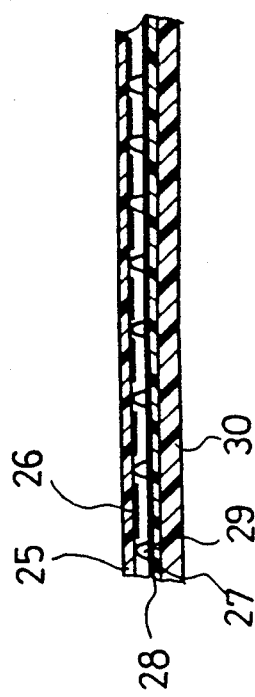

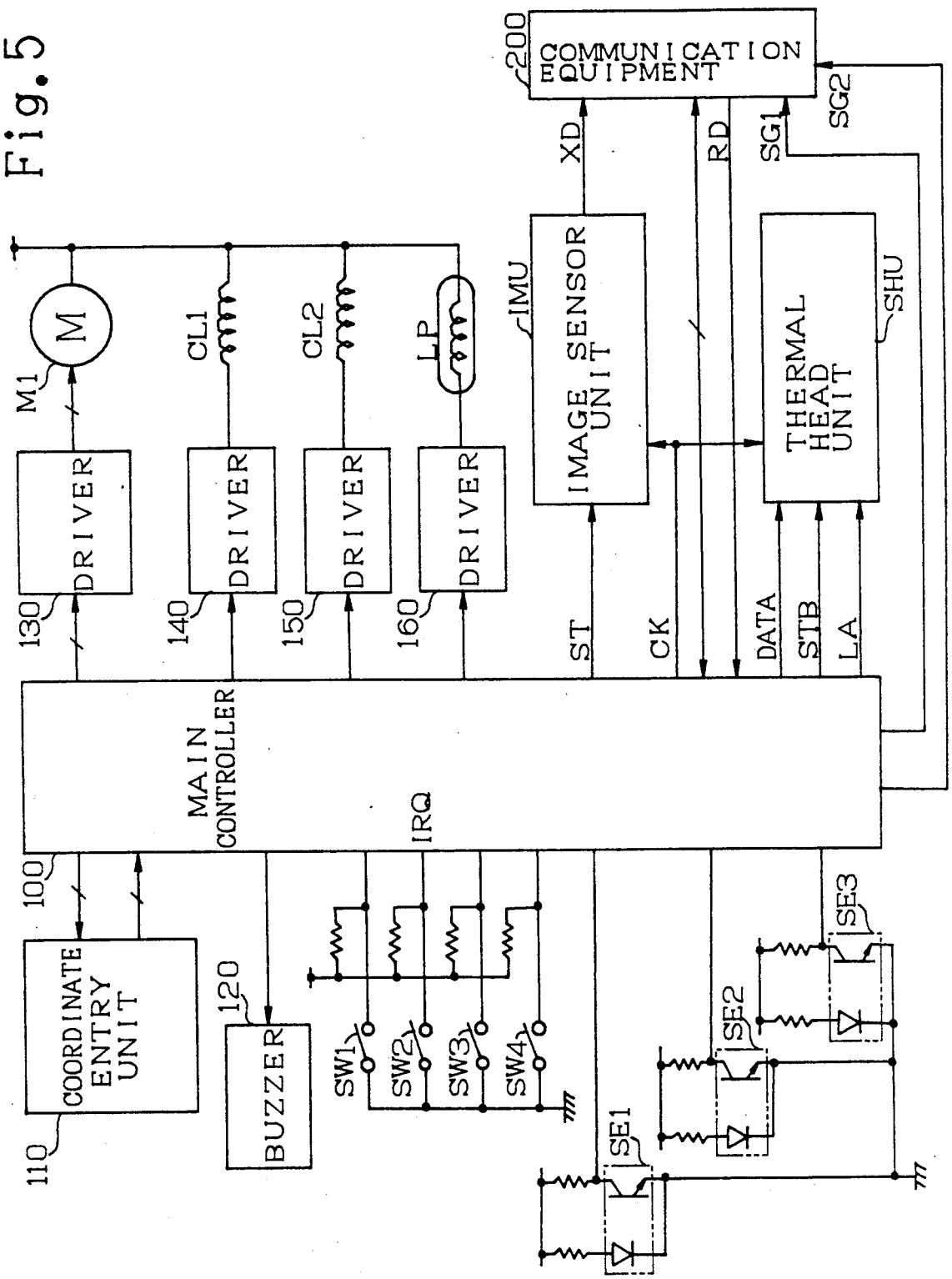

Fig. 7a

| | APPLICATION BLANK FOR SEAT RESERVATION OF NEW TOKAIDO LINE |
|---|---|
| BOARDING MONTH | THIS MONTH      NEXT MONTH |
| BOARDING DAY OF MONTH | 10's DIGIT    0 1 2 3 <br> 1's DIGIT    0 1 2 3 4 5 6 7 8 9 |
| TYPE OF TRAIN | KODAMA      HIKARI |
| BOARDING AND ALIGHTING STATIONS | TOKYO SHIN-YOKOHAMA ODAWARA ATAMI MISHIMA SHIZUOKA HAMAMATSU TOYOHASHI NAGOYA GIFUHAJIMA MAIBARA KYOTO SHIN-OSAKA SHIN-KOBE NISHIAKASHI HIMEJI AIOI OKAYAMA SHIN-KURASHIKI FUKUYAMA MIHARA HIROSHIMA SHIN-IWAKUNI TOKUYAMA OGOHRI SHIN-SHIMONOSEKI KOKURA HAKATA |
| DIRECTION | UP      DOWN |
| TIME OF DEPARTURE | A. M.      P. M. <br> H   0 1 2 3 4 5 6 7 8 9 10 11 <br> M   0 5 10 15 20 25 30 35 40 45 50 55 |
| NUMBER OF TICKETS | 1 2 3 4 5 6 7 8 9 |
| SEAT VARIETY | USUAL SEAT   NON-SMOKING SEAT   GREEN SEAT |
| | APPLICATION NUMBER: 9876543 |

Fig. 7b

| | APPLICATION BLANK FOR SEAT RESERVATION OF NEW TOKAIDO LINE |
|---|---|
| BOARDING MONTH | THIS MONTH    NEXT MONTH |
| BOARDING DAY OF MONTH | 10's DIGIT   0 1 2 3<br>1's DIGIT   0 1 2 3 4 5 6 7 8 9 |
| TYPE OF TRAIN | KODAMA    HIKARI |
| BOARDING AND ALIGHTING STATIONS | TOKYO SHIN-YOKOHAMA ODAWARA ATAMI MISHIMA SHIZUOKA HAMAMATSU TOYOHASHI NAGOYA GIFUHAJIMA MAIBARA KYOTO SHIN-OSAKA SHIN-KOBE NISHIAKASHI HIMEJI AIOI OKAYAMA SHIN-KURASHIKI FUKUYAMA MIHARA HIROSHIMA SHIN-IWAKUNI TOKUYAMA OGOHRI SHIN-SHIMONOSEKI KOKURA HAKATA |
| DIRECTION | UP    DOWN |
| TIME OF DEPARTURE | A.M.    P.M.<br>H 0 1 2 3 4 5 6 7 8 9 10 11<br>M 0 5 10 15 20 25 30 35 40 45 50 55 |
| NUMBER OF TICKETS | 1 2 3 4 5 6 7 8 9 |
| SEAT VARIETY | USUAL SEAT   NON-SMOKING SEAT   GREEN SEAT |

APPLICATION NUMBER: 9876543

IMAGE COMMUNICATION SYSTEM

BACKGROUND OF THE INVENTION

The invention relates to an image communication system which is used to transmit or receive an original in the form of an image through a telephone line, and in particular, to an image communication system which may be conveniently used to prepare a response to an image which has been transmitted from a mating system and which can be advantageously utilized in ordering goods, making a seat reservation of a traffic agency or making an enquête.

A facsimile equipment is available to perform an image communication. Briefly, a conventional facsimile equipment has the functions of reading an original in the form of an image and transmitting such information to a mating system, and of receiving and recording image information which has been transmitted from the mating system. An image reader and an image recorder are completely independent from each other. An original to be transmitted is placed on an original receptacle, and is discharged to an original discharge tray upon completion of the reading operation. A copy of the received image is discharged to a record paper tray.

Considering the reservation of a seat of a train, for example, it is necessary that various items of an application blank having a given format be filled out and deposited with a reservation center. Since it is advantageous to make such reservation as early an opportunity as possible, it is convenient if a reservation can be made by utilizing a telephone line or a facsimile equipment, without the trouble of going to the reservation center. A home reservation of the kind described is currently available by utilizing an on-line system such as CAPTAIN. However, this requires that the on-line system be provided with a reservation system at the location of the center while all customers (users) have a special terminal equipment in possession which can be connected with the system. If the format of the application blank must be updated even partly, the reservation system at the center must be changed, requiring a troublesome operation.

However, if a facsimile equipment is utilized, a home reservation is made possible without the trouble of going to the reservation center, by asking the center to transmit the application blank for purpose of reservation and filling it and transmitting it to the reservation center. Such system has a high level of universality since there is no need to change the hardware or software of the system if it is desired to change the format. In other words, such system can be utilized in various applications such as ordering goods, making a seat reservation of a traffic agency or making an enquête while retaining the same arrangement.

However, to make a home reservation utilizing a conventional facsimile equipment, a very troublesome operation is required as described below.

1. Dialing a telephone set to call a reservation center;
2. Receiving an image (an application blank of a given format) which is transmitted from the reservation center by means of a facsimile equipment;
3. Using a writing instrument to fill a hard copy of the received image representing the application blank; and
4. Dialing the telephone set again to transmit the image of the filled application form to the reservation center by means of the facsimile equipment. Such operation is very troublesome. In particular, where it is desired to make such a reservation by utilizing a facsimile equipment which is onboard an automobile, for example, a writing instrument or a hard underlay on which to fill out the application form may not be available, causing a great deal of trouble to complete the entry.

SUMMARY OF THE INVENTION

It is an object of the invention to simplify a reply operation when receiving and transmitting image information utilizing an equipment such as a facsimile equipment.

This object is accomplished in accordance with the invention by providing an arrangement in which a common use is made of a paper discharge tray into which a copy (record paper) of a received image is discharged and a receptacle on which an original to be transmitted is to be placed.

With this arrangement, a sheet on which a received image is recorded need not be removed from the system, but instead additional information such as marks may be entered so as to be directly returned to the reservation center as a reply operation. Since the original receptacle can be utilized as a hard underlay, there is no need to provide a separate underlay to allow the entry of additional information.

In a preferred embodiment of the invention to be described later, tray means which is used in common as a paper discharge tray and an original receptacle is provided with information entry means for entering information relating to a position on such means and delivering such information to electronic control means, which is then controlled to record additional visible information on the sheet on which the image is already recorded, depending on the position which is supplied from the information entry means. A recorder which records a received image may be used as such means which records or enter additional visible information. In this manner, it is possible to prepare an original to be returned, or to complete the entry of marks onto the received image without requiring a separate provision of a writing instrument.

Other objects and features of the invention will become apparent from the following description of an embodiment thereof which is illustrated in the drawings.

BRIEF DESCRIPTION OF THE DRAWINGS

FIG. 2 is a perspective view of a compartment of an automobile on which a facsimile equipment incorporating the invention is mounted;

FIG. 3 is a right-hand side elevation, to an enlarged scale, of the facsimile equipment shown in FIG. 2;

FIGS. 4a and 4b are an exploded, perspective view and a longitudinal section of an essential part of a position entry board 4;

FIG. 5 is a block diagram of the electrical circuit of the facsimile equipment 1 shown in FIG. 2;

FIGS. 7a and 7b are plans showing an example of a received image and a returned image;

DETAILED DESCRIPTION OF PREFERRED EMBODIMENT

Figure 1:
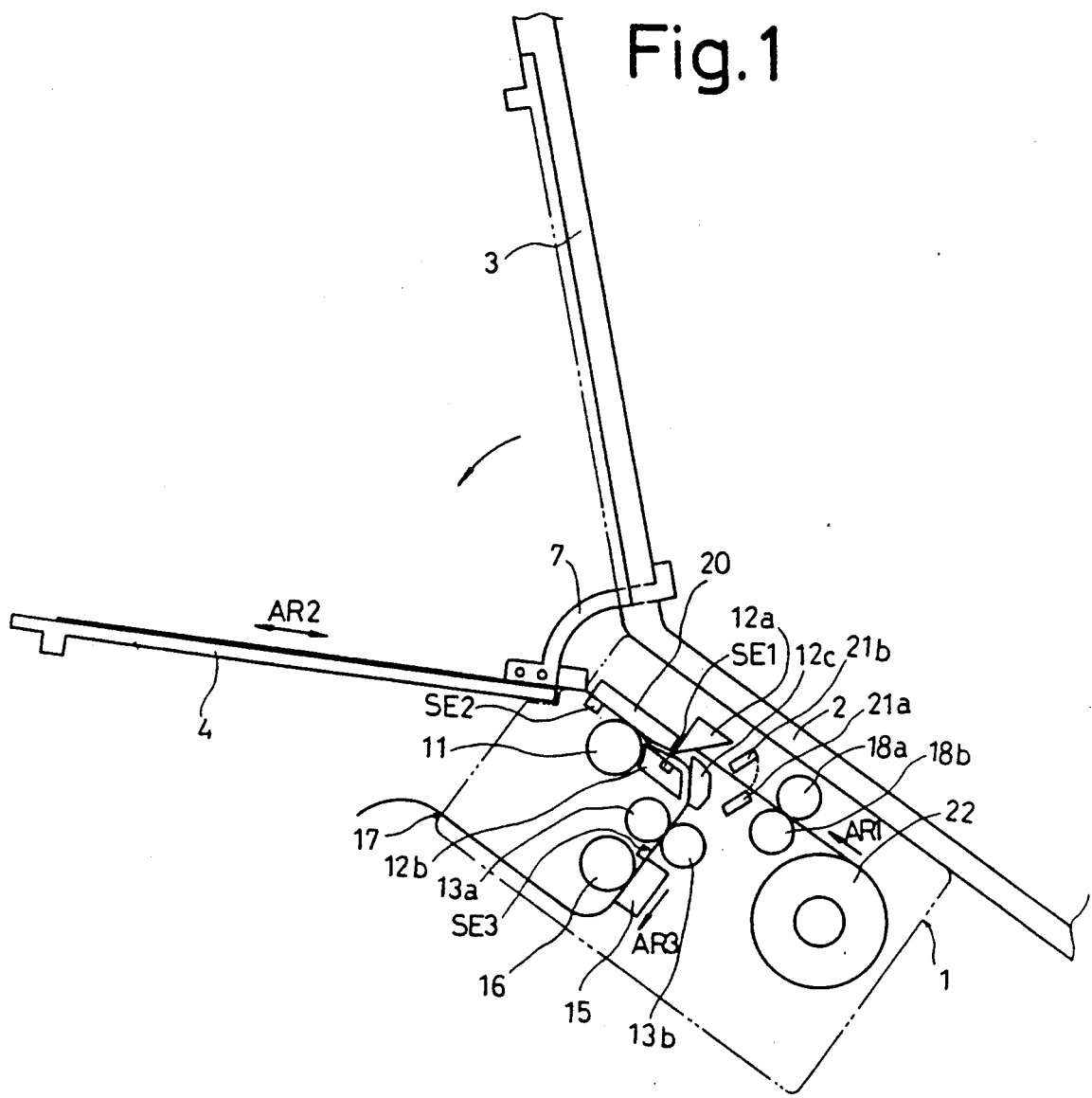
FIG. 1 is a side elevation schematically illustrating the internal construction of a facsimile equipment 1 shown in FIG. 2.

FIG. 2 shows a compartment of an automobile on which a facsimile equipment 1 incorporating the invention is mounted. Specifically, the facsimile equipment 1 is disposed in an instrument panel 2 at a location opposite to an assistant driver's seat and below a glove box 3. A position entry board 4 is disposed along the door of the glove box 3. The position entry board 4 is used to enter position information and is also utilized as a record paper discharge tray and an original receptacle. Three switches SW1, SW2 and SW3 are disposed to the right of the glove box 3.

FIG. 3 shows the facsimile equipment 1 of FIG. 2 to an enlarged scale, as viewed from the right-hand side. In this Figure, it will be noted that the position entry board 4 is integrally constructed with the facsimile equipment 1 so as to be tiltable. Thus, when the facsimile equipment 1 is not in use, the board 4 is disposed alongside the surface of the glove box 3 as indicated by phantom lines while it is tilted to a substantially horizontal position as indicated by a solid line when the equipment is to be used. A bracket 5 is secured to the instrument panel 2, and fixedly carries a pivot 6, about which the position entry board 4 can be rocked. A hinge 7 supports the board 4 and also limits the extent of such rocking motion.

FIGS. 4a and 4b are an exploded, perspective view and a longitudinal section of the position entry board 4. Referring to these Figures, the board comprises a support plate 30 on which a transparent film 27 is disposed. Another transparent film 25 is disposed on top of the film 27. On its upper surface, the transparent film 27 has a plurality of strips 28 of transparent, electrically conductive material applied thereto which extend in a transverse direction, thus forming a number of electrodes 28a, 28b, 28c, . . . . A number of small protuberances 29 are disposed at equal intervals on the upper surface of the film 27 to serve as spacers which maintain a spacing between the films 25 and 27. A number of strips 26 of transparent, electrically conductive material which extend in a longitudinal direction are applied to the lower surface of the film 25, thus forming a number of electrodes 26a, 26b, 26c, . . . . Thus, the electrodes 28a, 28b, 28c, . . . are normally spaced from the electrodes 26a, 26b, 26c, . . . . However, the film 25 becomes flexed in response to the application of a depressing force which is applied in the direction of the thickness, whereby an electrical conduction is established between parts of the electrodes 28a, 28b, 28c, . . . and the electrodes 26a, 26b, 26c, . . . . In this manner, by sequentially scanning the electrodes 28a, 28b, 28c, . . . and the electrodes 26a, 26b, 26c, . . . , it is possible to determine where the depressing force is applied by examining a conduction therebetween. In this manner, the position entry board 4 can be used as an x-y coordinate entry unit.

FIG. 1 schematically shows the internal construction of the facsimile equipment 1. Specifically, the equipment includes a roll 22 of record paper, a pair of pay-off rollers 18a, 18b, a pair of cutters 21a, 21b which operate to sever a record paper, blocks 12a, 12b and 12c which define a path along which the sheet is conveyed, a platen 11, a thermal head 20, a pair of rollers 13a, 13b which convey a sheet of original, a roller 16 disposed in opposing relationship with an image sensor 15, and optical sensors SE1, SE2 and SE3 of reflection type which are used to detect the presence of a sheet. While not shown in FIG. 1, there is provided a stepping motor (M1) which is used to drive various parts, and which has a drive shaft which is connected to the roller 18a, the cutter 21a, the platen 11, the rollers 13a and 16. It is to be noted that the roller 18a and the cutter 21b are associated with electromagnetic clutches CL1 and CL2, respectively. An exposure lamp (LP) is disposed adjacent to the image sensor 15.

FIG. 5 shows the electrical circuit of the facsimile equipment 1. The circuit comprises a main controller 100 which essentially comprises a microcomputer system for controlling a system operation of the facsimile equipment. Connected to the main controller 100 are a coordinate entry unit 110, a buzzer 120, the switches SW1, SW2, SW3 and a switch SW4, the optical sensors SE1, SE2 and SE3, drivers 130, 140, 150 and 160, an image sensor unit IMU, a thermal head unit SHU, and a communication equipment 200. The stepping motor M1, the clutches CL1 and CL2 and the lamp LP are connected to output terminals of the drivers 130, 140, 150 and 160, respectively.

Figure 6A:
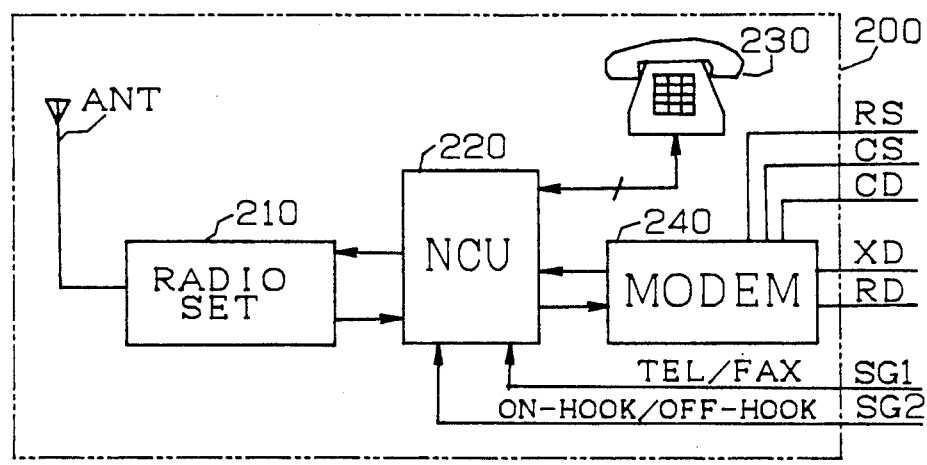
FIGS. 6a and 6b are block diagrams of a communication equipment 200 and a coordinate entry unit 110 both shown in FIG. 5.

FIG. 6a shows the arrangement of the communication equipment 200. Specifically, it comprises a transmitting/receiving antenna ANT, a radio set 210, a network control unit (NCU) 220, a telephone set 230 and a modem 240. The communication equipment 200 includes various signal lines RS, CS, CD, XD, RD, SG1 and SG2. The signal line RS represents an input line which is used to control "Request to Send", the signal line CS represents an output line which is used to indicate "Clear to Send", the signal line CD represents an output line which indicates the result of "Carrier Detect", the signal line XD represents an input line which conveys a serial transmission data, and the signal line RD represents an output line which carries a serial received data. The signal line SG1 represents a control input line for selecting between the telephone set 230 and the modem 240 (namely, facsimile equipment) as a terminal which is connected to a communication channel while the signal line SG2 represents a control input line which switches between an on-hook/off-hook condition.

Figure 6B:
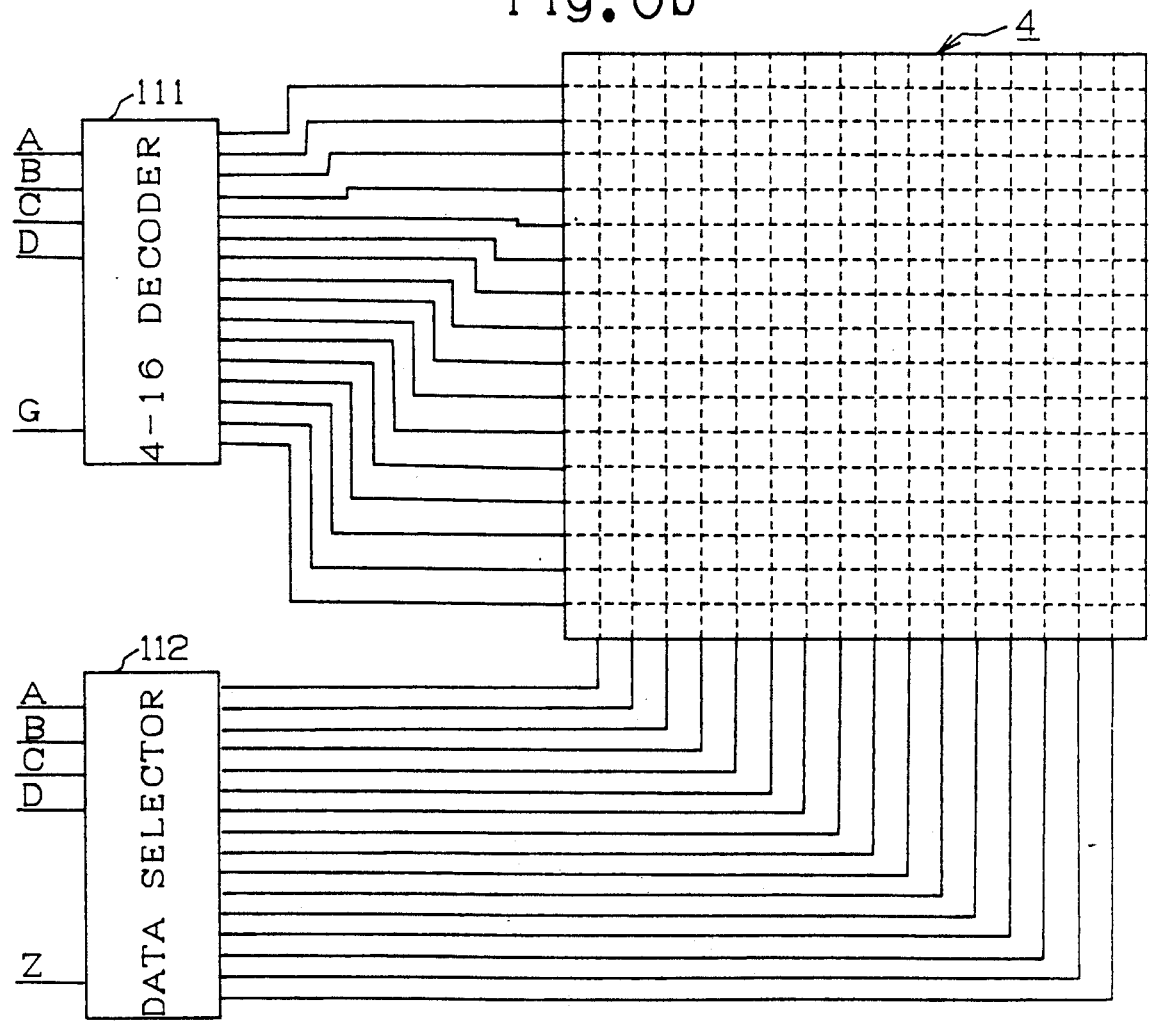

FIG. 6b shows the coordinate entry unit 110. Specifically, the unit includes the position entry board 4, a decoder 111 and a data selector 112. The decoder 111 operates to decode a 4-bit signal (A, B, C, D) which is output from the main controller 100 into a 16-wire signal for application to 16 transversely extending electrodes of the position entry board 4 in synchronism with a strobe signal G. The data selector 112 selects certain signals on 16 wires which are output from the longitudinally extending 16 electrodes of the position entry board 4 in accordance with the 4-bit signal (A, B, C, D) which is output from the main controller 100 to deliver a corresponding signal to an output signal line Z.

Returning to FIG. 5, the image sensor unit IMU includes the image sensor 15, a timing signal generator which controls it and an image signal processing circuit. Such circuits are not special in nature, but similar to a conventional arrangement used in a facsimile equipment, and therefore will not be described in detail. It is to be noted that the image sensor 15 used herein comprises one dimensional CCD image sensor which is used in a close contact manner. A signal line ST is used to command the initiation of reading an image for one line while a signal line CK is used to convey a clock pulse which determines the timing for individual picture elements.

The thermal head unit SHU includes the thermal head 20 and an electrical circuit which controls it. While no special circuit arrangement is used, the operation of the thermal head unit SHU will be briefly described. Data to be recorded is delivered as serial data, divided into picture elements, by the main controller 100 in synchronism with the clock pulse CK through a signal line DATA. After data covering one line is stored in an input register within the thermal head unit SHU, signal lines ST and LA are changed to given levels, whereupon the entire data contained in the input register is transferred and latched in an output register at one time, and data in the output register which corresponds to each individual picture element energizes a heating cell which corresponds to the position of each picture element.

The general operation of the facsimile equipment 1 will now be described. The facsimile equipment 1 has a special mode of operation, namely, a reply mode. In the reply mode, a hard copy of an image of a given format which is received from the reservation center by means of the facsimile equipment is discharged onto the position entry board 4 where it is positioned. When a selected position on the board is indicated by an operator of the facsimile equipment 1, required mark or marks are recorded on the hard copy utilizing the thermal head 20. The hard copy which is recorded with such marks is now used as an original to be transmitted, and is fed into an image reader (or image sensor), thus transmitting the image by means of the facsimile equipment.

A specific example will now be described with reference to a seat reservation of a traffic agency. FIG. 7a shows one exemplary format of an application blank which may be used to make a seat reservation of New Tokaido Line. Referring to FIG. 7a, it will be noted that the blank includes rows of a month when taking a train, a day of month when taking the train, the type of train, boarding and alighting stations, direction, time of departure, the number of tickets, the seat variety and an application number. The application number is entered on the original by the reservation center before the transmission takes place.

When using the application blank, the content of reservation can be specified by applying a mark to either one of a plurality of items included in each row. FIG. 7b shows an example of a format which is filled with marks entered. In FIG. 7b, a mark is shown by a hatching. It will be seen from FIG. 7b that the reservation blank shown has made a reservation of three non-smoking seats of a Hikari train in the down direction for a section between Tokyo and Nagoya having a departure time of 7:00 a.m. on 15th of this month. If a train which matches the departure time indicated on the application blank is not available, the reservation center may choose a train having a departure time closest thereto. It will be seen that by utilizing this format, the content of reservation for a seat of New Tokaido Line can be specified by merely applying a simple mark or marks to given positions on the format.

Figure 8:
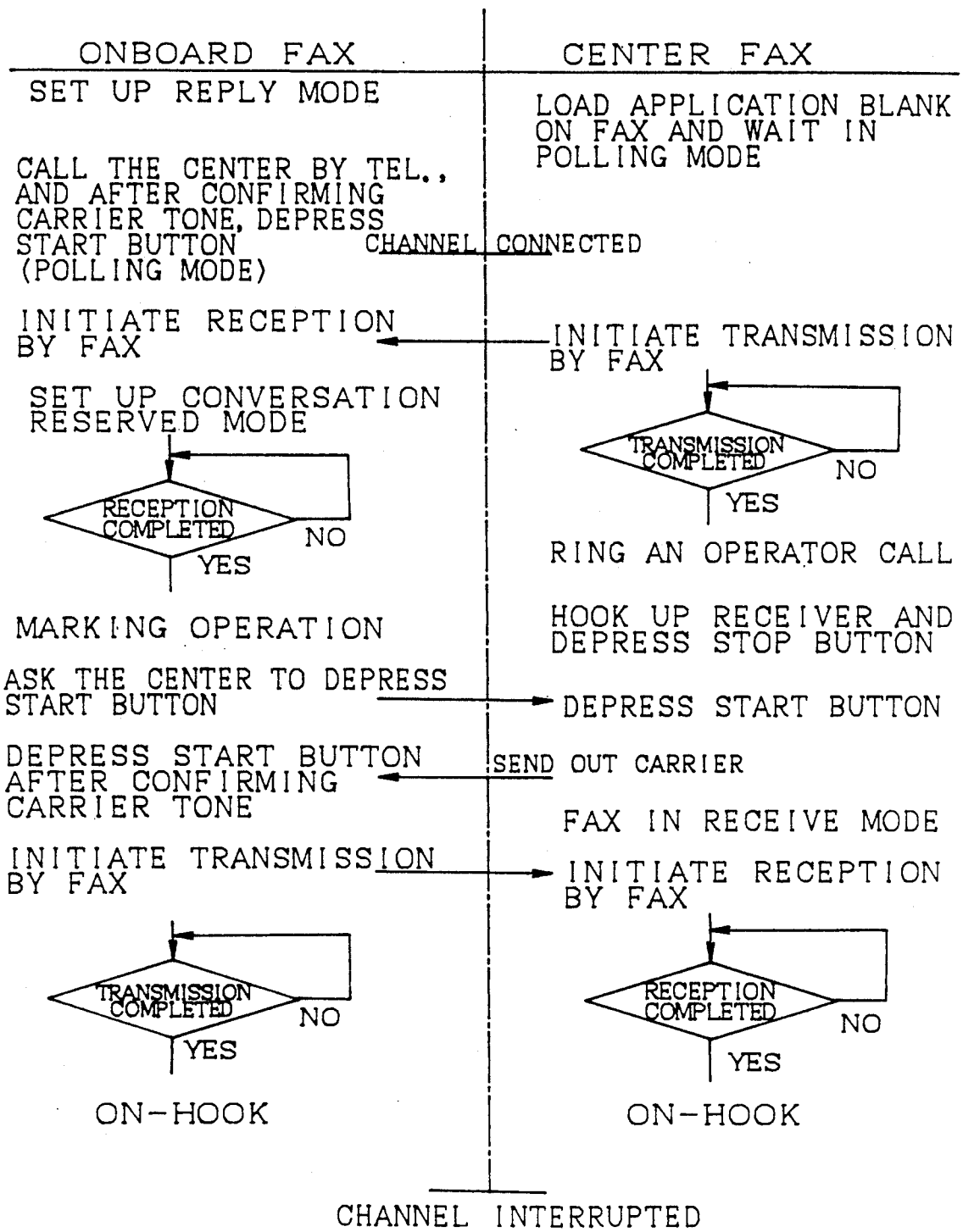
FIG. 8 is a flow chart schematically illustrating a communication procedure used in a reply mode of the facsimile equipment 1.

FIG. 8 schematically illustrates the content of a communication which takes places between a facsimile equipment within the reservation center and an onboard facsimile equipment 1 for a seat reservation.

In this example, it is assumed that an existing facsimile equipment, for example, RIFAX 4350 manufactured by Ricoh K.K., is used as a facsimile equipment installed on the reservation center. This means that a reservation can be made between an onboard facsimile equipment of this embodiment and a facsimile equipment of the reservation center without requiring any change on the part of the reservation center. A procedure to make a reservation will now be described with reference to FIG. 8.

The facsimile equipment of the reservation center is maintained in its polling mode in which the format of an application blank (see FIG. 7a) having a serial application number entered is placed on a reading receptacle as an original. An operator of the onboard equipment, for example, a driver, then operates the switch SW1 of the onboard facsimile equipment to set up a reply mode. He then hooks up a receiver of the telephone set 230 and then dial the telephone number of the reservation center. After confirming a carrier tone ("peep") from the facsimile equipment of the reservation center, he then operates the switch SW2 to initiate the communication. Under this condition, a polling operation is executed, whereby the calling facsimile equipment onboard the automobile becomes a receiving party, and an image transmitted from the called facsimile equipment of the reservation center, or the format shown in FIG. 7a, is transmitted to the onboard facsimile equipment.

After the initiation of the communication, a conversation reserved mode is automatically set up in the onboard facsimile equipment. In a usual communication using a facsimile equipment, a communication channel will be interrupted and a communication will be terminated immediately upon the termination of a transmission. However, when a conversation reserved mode is set up, the communication channel remains connected even after the completion of a transmission, thus switching from a facsimile to a telephone communication.

When the transmission is complete, the facsimile equipment of the reservation center sends out an operator calling tone since the conversation reserved mode is set up. In response thereto, the operator hooks up a receiver and depresses a stop button, whereupon the equipment of the reservation center is switched from a facsimile to a telephone communication.

On the part of the onboard facsimile equipment, upon completion of receiving the format, a marking operation is made on the format of the application blank which a hard copy. Specifically, in the example shown in FIG. 7b, the operator presses his finger or the like against "this month" in the row of the month when taking the train, against "1" and "5" in the row of the day of month when taking the train, against "Hikari" in the row of the type of train, against "Tokyo" and "Nagoya" in the row of boarding and alighting stations, against "down" in the row of direction, against "a.m.", "7" and "0" in the row of departure time, against "3" in the row of the number of tickets, and against "non-smoking seats" in the row of variety on the format or hard copy. When such operation has been completed, the operator then operates the completion switch SW3. Thereupon, various positions against which the finger is pressed are read, and the thermal head of the onboard facsimile equipment records marks (hatching shown in FIG. 7b) on the hard copy at designated positions.

Upon completion of the marking operation, the operator on the automobile asks the operator of the reservation center to depress a start button by way of telephone. When the operator of the reservation center depresses the start button, its facsimile equipment is set up in the receive mode, and the facsimile equipment of the reservation center sends out a carrier signal.

The operator of the onboard facsimile equipment confirms the carrier tone which is transmitted from the facsimile equipment of the reservation center and then operates the start button or switch SW2. An image of the hard copy (see FIG. 7b) on the onboard facsimile equipment on which a marking operation has been completed then begins to be transmitted from the onboard facsimile equipment to the facsimile equipment of the reservation center as a reply.

Upon completion of the transmission from the onboard facsimile equipment, it interrupts the communication channel, whereby it assumes an on-hook condition while the facsimile equipment of the reservation center interruppts a communication channel and assumes an on-hook condition upon completion of the reception.

A specific operation of the facsimile equipment 1 will now be described. FIGS. 9a to 9g illustrate the operation of the facsimile equipment 1. Initially considering FIG. 9a, there is shown a receiving operation during a normal mode. When the power supply is turned on, an initialization is made, followed by examining the presence or absence of any carrier signal detected. If the carrier signal is detected, the program proceeds to step A3 where a given facsimile interconnection protocol is executed, thus establishing a communication channel between the onboard facsimile equipment and the mating or transmiting facsimile equipment, whereupon the program proceeds to step A4.

At step A4, the clutch CL1 is turned on, thus conveying the record paper until the optical sensor SE2 assumes an on condition (representing the detection of the sheet) (steps A5, A6 and A7). When the steps A6, A7 are executed, the stepping motor M1 rotates in the reverse direction through one step. When the motor M1 is driven, the on condition of the clutch CL1 allows the rollers 18a and 18b to rotate, thus feeding the leading end of the record paper from the roll 22 toward the cutter 21a. In this manner, the record paper which is paid off passes over the cutters 21a and 21b, between the blocks 12a and 12c, between the blocks 12a and 12b, and between the platen 11 and the thermal head 20, whereby the record paper is positioned so that its leading end reaches the optical sensor SE2.

Figure 9A:
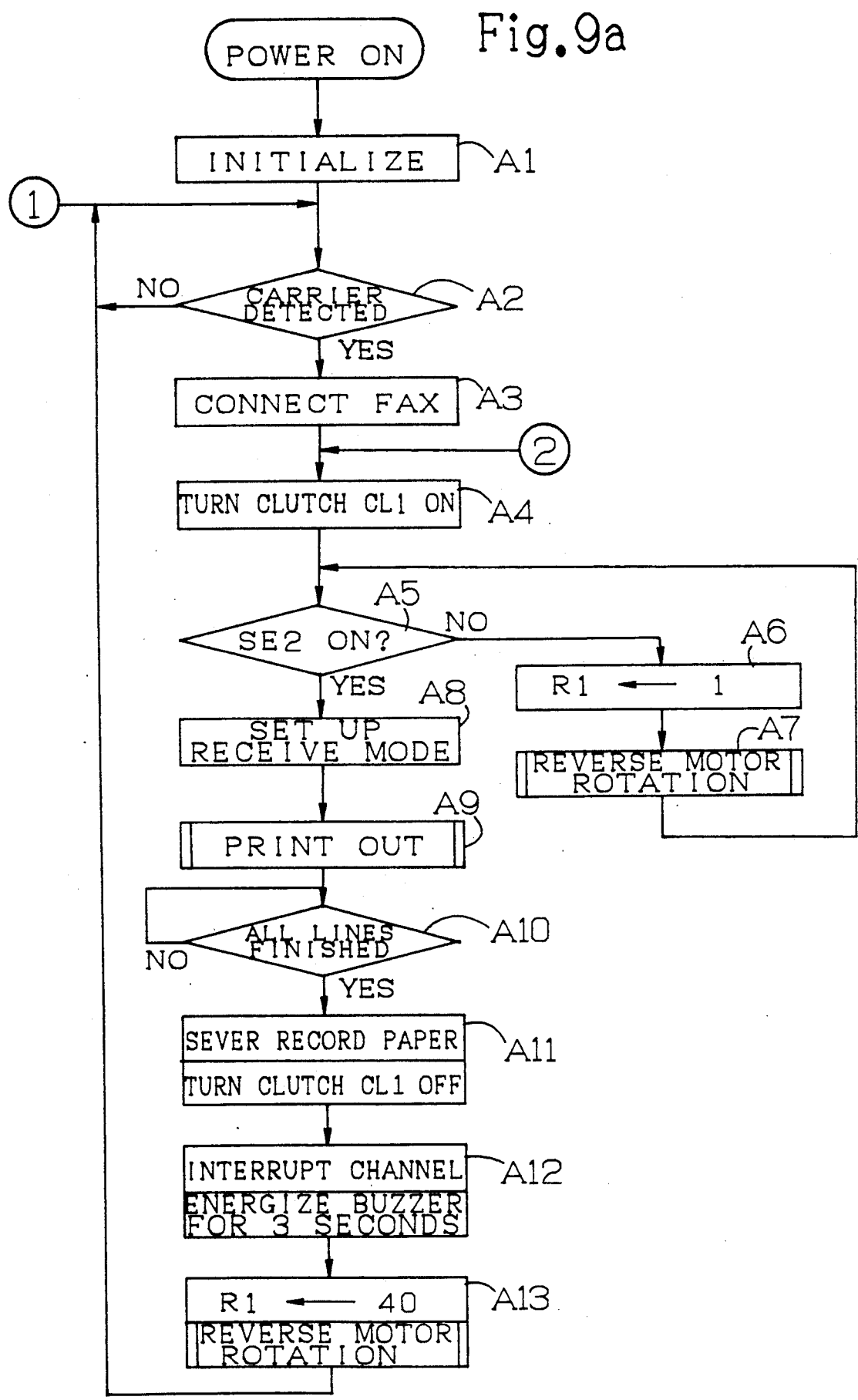
FIGS. 9a, 9b, 9c, 9d, 9e, 9f and 9g are flow charts schematically illustrating the operation of a main controller 100 in FIG. 5.
Figure 9B:
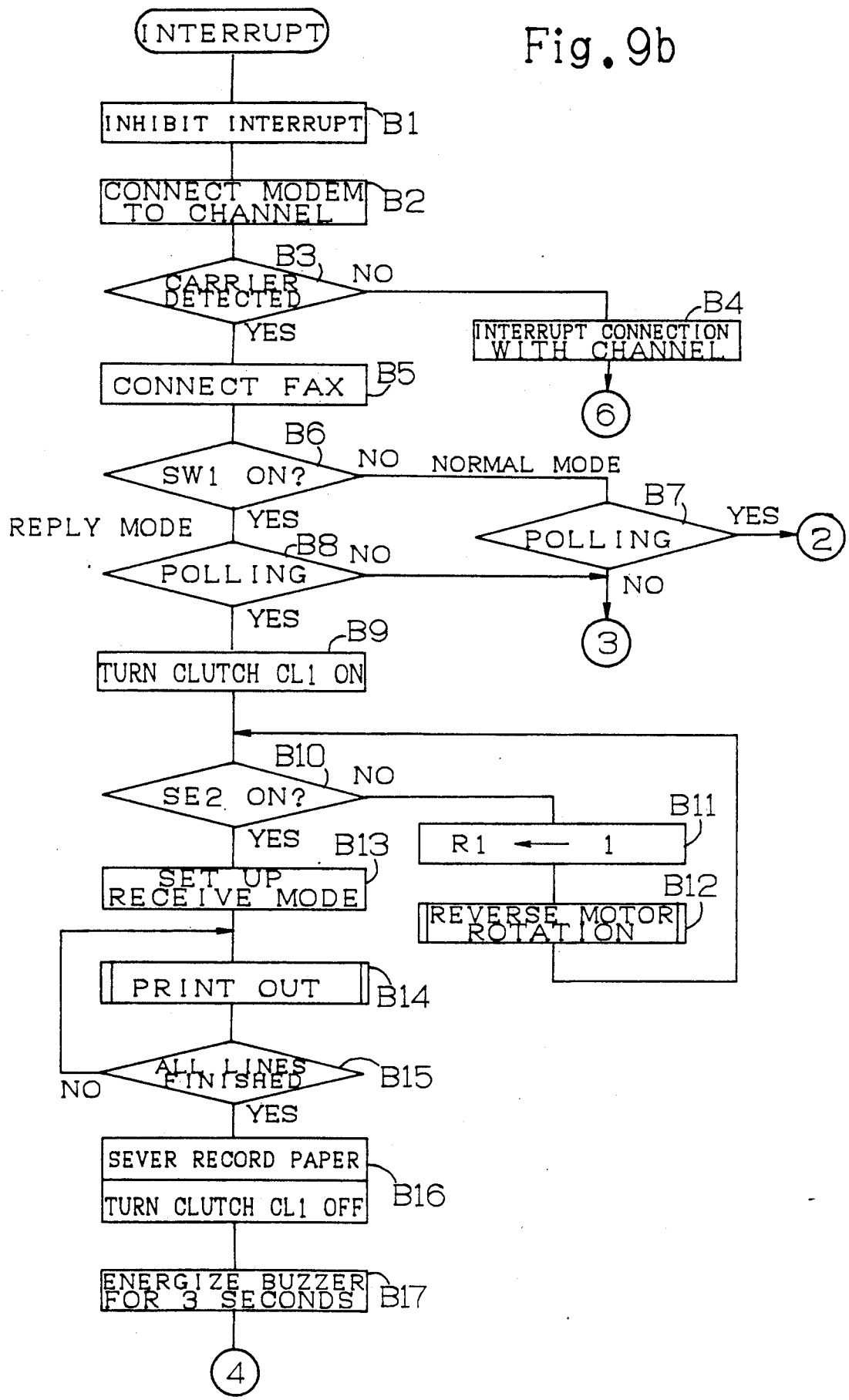
Figure 9C:
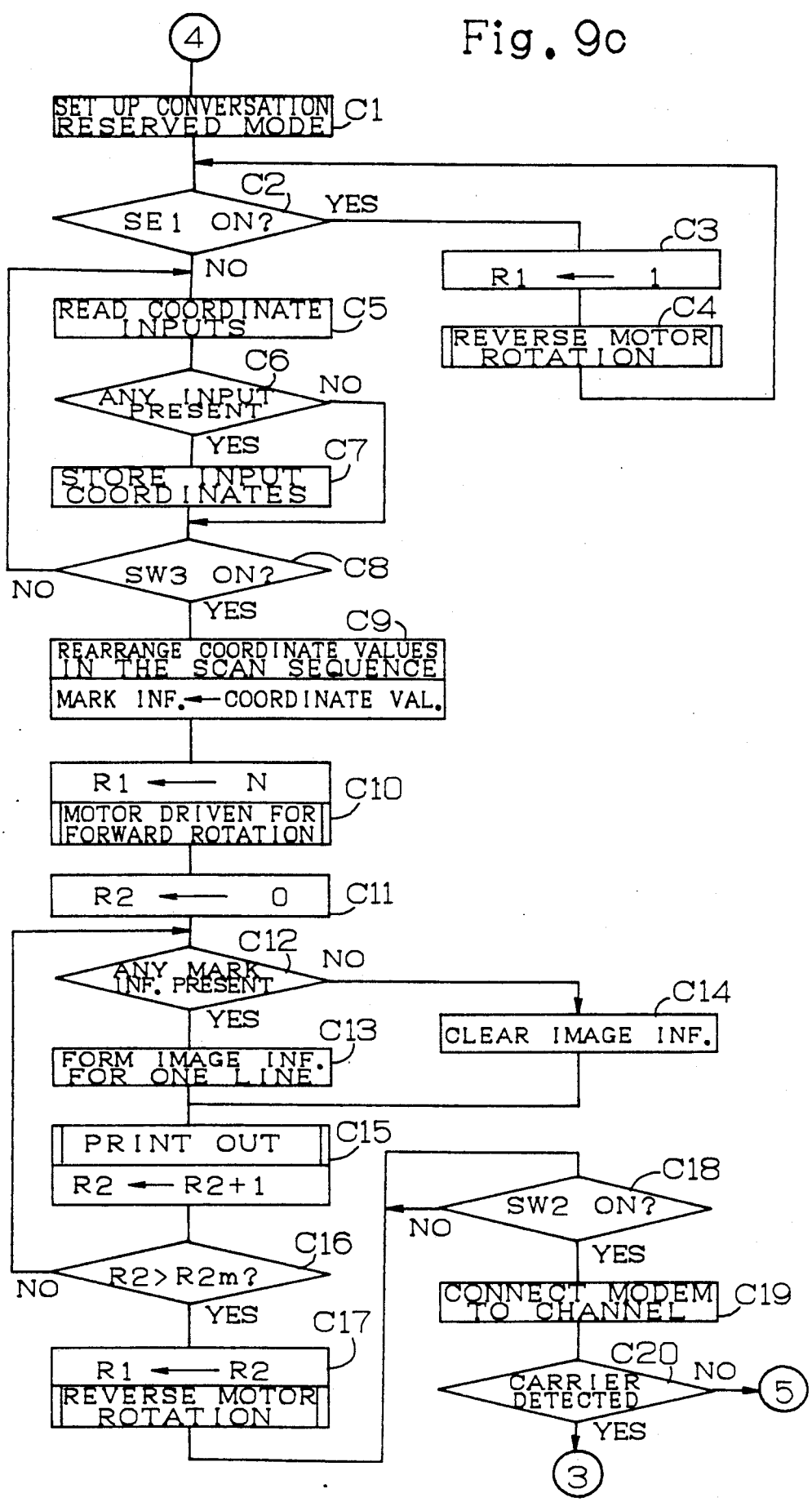
Figure 9D:
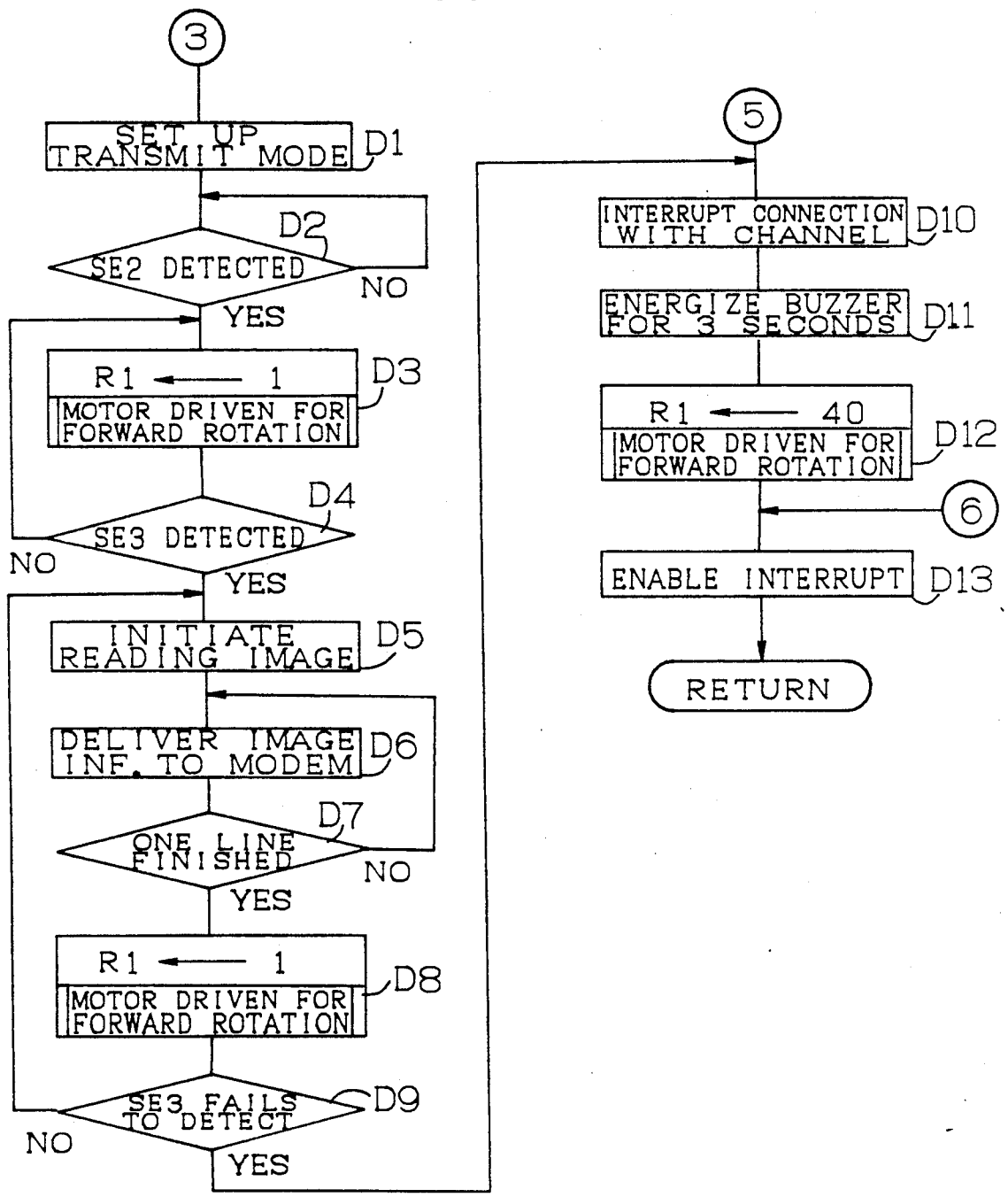
Figure 9G:
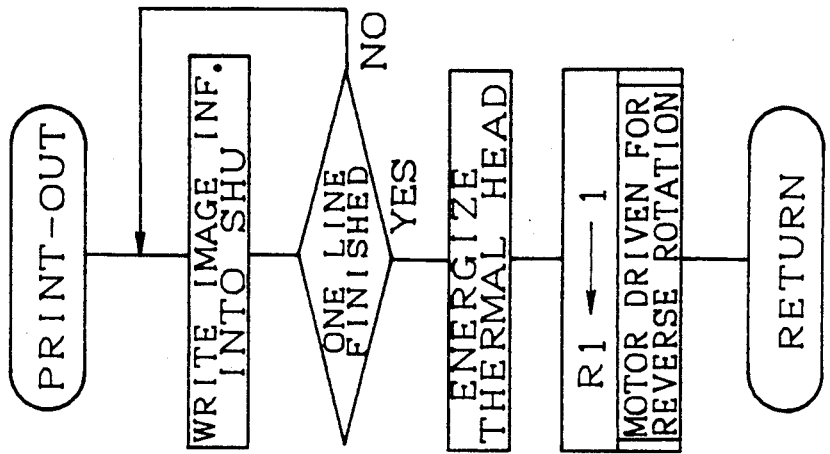

Subsequently modem 240 is set up in its receive mode (step A8) and a printing operation is executed until the entire lines of image data which has been transmitted is completed (steps A9 and A10). The detail of the printing operation is illustrated in FIG. 9g. Specifically, in the printing operation, image information which is received through the modem 240 is successively fed to the thermal head unit SHU, and the thermal head is energized (to update line data) at the end of each line, forwarding the record paper by one step or by an amount corresponding to one line toward the position entry board 4. When the entire lines have been read and recorded, the clutch CL2 is turned on for a given interval, and the record paper is severed by means of the cutters 21a and 21b, followed by turning the clutch CL1 off to cease a feeding of the record paper from the roll 22 (step A11).

The communication channel is then interrupted, and the buzzer 120 is energized for three seconds (step A12), and the stepping motor is caused to rotate in the reverse direction through 40 steps, thus discharging the record sheet which has been recorded and severed onto the position entry board 4. Under this condition, the trailing end of the record sheet is located nearer the position entry board 4 than the platen 11, where it is not held between the platen 11 and the thermal head 20, allowing the operator to remove it in a simple manner.

The operation which occurs when the switch SW2 is turned on will now be described. As shown in FIG. 5, the output terminal from the switch SW2 is connected to an interrupt request terminal IR0 of the main controller 100. Accordingly, when the switch SW2 is turned on, the internal microcomputer of the main controller 100 executes an interrupt operation, which is illustrated in FIGS. 9b, 9c and 9d. Initially considering FIGS. 9b, upon entry of the interrupt operation, the interrupt is initially inhibited, and the modem 240 is connected to the communication channel. The presence of a carrier signal is then examined. If the carrier signal is not detected, the communication channel is interrupted. However, if the carrier signal is detected, a given protocol is executed for connection of the facsimile equipment. The mode switch SW1 is then examined. If SW1 is on, indicating the reply mode, the program proceeds to step B8 while if SW1 is off, indicating the normal mode, the program proceeds to step B7.

In either mode, it must be initially determined whether the mating or receiving facsimile equipment is in its polling condition. Unless the equipment is in its polling condition, the program proceeds to the transmission beginning with step B1 shown in FIG. 9d in either mode. If the mating facsimile equipment is in its polling condition during the reply mode, the program proceeds to step B9. If the mating equipment is in its polling condition during the normal mode, the program proceeds to step A4, executing the receiving operation.

The reply mode will be considered in detail. The clutch CL1 is initialy turned on (step B9), conveying the record paper until the optical sensor SE1 assumes its on condition, indicating the detection of the sheet (steps B10, B11 and B12). The execution of the steps B11 and B12 causes the stepping motor M1 to rotate in the reverse direction through one step. As the motor M1 is driven, the on condition of the clutch CL1 allows the rollers 18a, 18b to rotate, whereby the leading end of the record paper from the roll 22 is paid off toward the cutter 21a. In this manner, the record paper which is fed in this manner passes over the cutters 21a and 21b, between the blocks 12a and 12c, between the blocks 12a and 12b and between the platen 11 and the thermal head 20, whereby the record paper is positioned so that its leading end reaches the optical sensor SE2. The modem 240 is then set up in its receive mode (step B13), followed by executing a printing operation until the entire lines of image data being transmitted are printed out (steps B14 and B15). The detail of the printing operation is similar to that described in connection with the step A9.

When the entire lines have been read and recorded, the clutch CL2 is turned on for a given time interval to sever the record paper by means of the cutters 21a and 21b, and then the clutch CL1 is turned off, thus ceasing a feeding of the record paper from the roll 22 (step B16).

Figure 10:
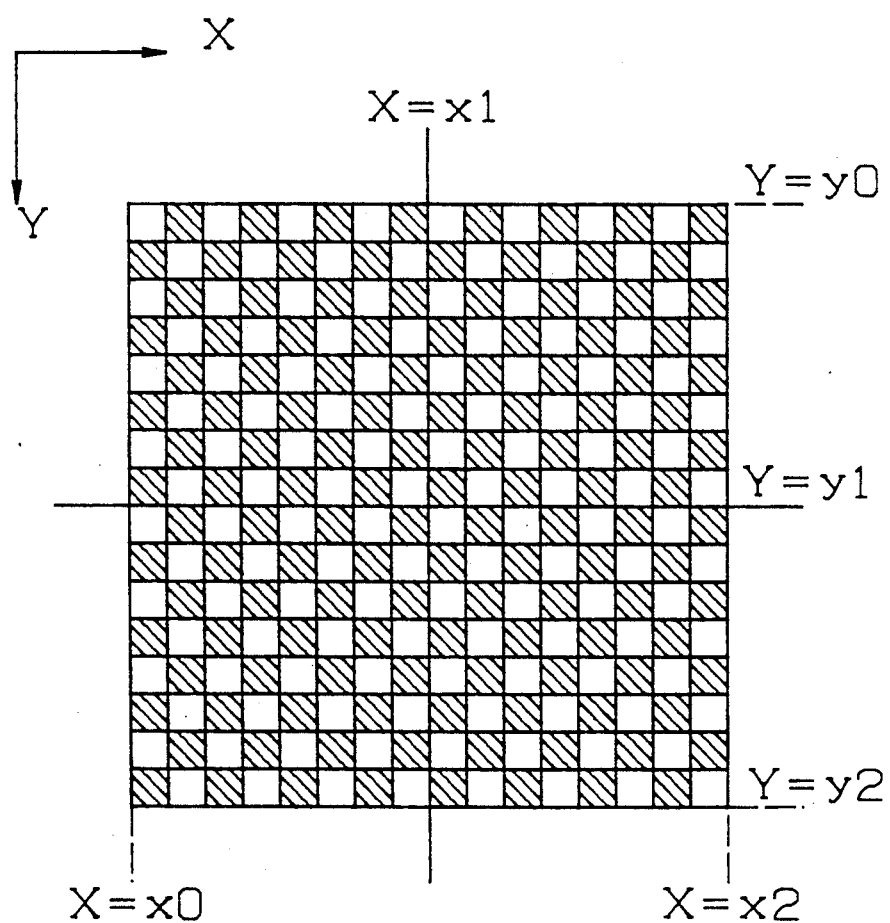
FIG. 10 is a plan view showing an exemplary pattern of mark information which is to be added to a received image.

The buzzer is then energized for a time interval of three seconds (step B17) to indicate the termination of the reception to the operator. A conversation reserved mode is then set up (C1 shown in FIG. 10c), driving the stepping motor M1 for rotation in the reverse direction until the optical sensor SE1 is turned off (steps C2, C3, C4). Accordingly, the sheet which has the received image recorded thereon and which has been severed advances to a position where the trailing end has moved past the optical sensor SE1 where it comes to a stop. Under this condition, the trailing end of the sheet is held between the platen 11 and the thermal head 20 so as to be prevented from disengaged from the position entry board 4.

The individual electrodes on the position entry board 4 are then sequentially scanned to examine the presence of any input from the operator (the depression of key or keys) (step C5). Where an input is found, the coordinates of such input are determined on the basis of the position of a particular electrode which has been turned on, and are stored in a given memory within the main controller 100. A reading of coordinate input is repeatedly executed as long as the switch SW3, which commands the termination of an input, remains off.

When the switch SW3 is turned on, the program proceeds to step C9. The coordinates of all inputs which are stored in the memory are examined and re-arranged in the sequence of scanning. It is to be noted that the sequence of scanning is opposite to the scan direction which is utilized during the reception with respect to the sub-scan direction (the direction in which the sheet is fed). Information indicating marks to be recorded are formed on the basis of the re-arranged coordinates. Specifically, referring to FIG. 10, in the present example, a square region which is centered about X coordinate x1 and Y coordinate y1 which are entered, and having a given width corresponding to a given number of picture elements (x1-x0, x2-x1, y1-y0 or y2-y1) on the opposite sides thereof is defined as a region in which a mark is to be applied. In the square region, a pattern is formed in which a recorded picture element and a non-recorded picture element appear in alternate picture element positions. Thus, information representing a mark which is applied includes scan coordinates, thus, coordinates represented in terms of picture elements. The stepping motor M1 is then driven for rotation in the forward direction through N steps (step C10). This causes the hard copy sheet to be conveyed until one end of an image on the hard copy (or the trailing end as considered in the direction in which the copy is conveyed during the reception) reaches the thermal head 20.

A register R2 which is used in counting the number of lines or the position of image in the sub-scan direction is cleared to 0 at step C. At step C12, it is examined whether mark information which may have been produced during the processing at step C9 exist on a line which corresponds to the content of the register R2. If it is found that such mark information exists, a record data for one line including such mark information is formed while a record data for one line is cleared if such mark information does not exist. A printing operation, which is similar to that occurring at step A9 mentioned above, is then executed, and the register R2 is incremented (step C15). The operation of the steps C12 to C15 is repeated until the content of the register R2 reaches a maximum value R2m of the line number on which mark information applied may be present. In this manner, mark information is additionally recorded by the thermal head 20 on the hard copy sheet at coordinates which are designated by the operator, producing an image on the hard copy sheet as illustrated in FIG. 7b, for example.

When the marking operation has been completed, the program proceeds to step C17 where the content of the register R2 is transferred to a register R1, and the motor is driven for rotation in the reverse direction. This drives the platen 11, whereby the hard copy sheet is moved back to its position which it assumed before the marking operation takes place. Step C18 waits for the switch SW2 to be turned on. When the switch SW2 is turned on, a switching is made from the telephone to the modem, and the modem 240 is connected to the communication channel. At step C20, the presence or absence of any carrier signal detected is examined. When the presence of a carrier signal is detected at step C20, a transmission beginning with step D1 shown in FIG. 9d is executed. It is to be noted that the operation of this transmission is similar to a normal operation which takes place when transmitting an image.

At step D1, the modem 240 is switched to a transmit mode, and step D2 waits for the optical sensor SE2 to detect the presence of the sheet. When the sensor SE2 detects the sheet or finds that the original or the hard copy sheet utilized for the reply operation is loaded on the position entry board 4 at a given position, the program proceeds to step D3, where "1" is loaded into the register R1 to drive the motor for rotation in the forward direction. However, if the optical sensor SE3 does not detect the presence of the sheet, the operation of step D3 is executed again. Accordingly, the original sheet is conveyed until the leading end of the sheet, as viewed in the forward direction (indicated by an arrow AR3 shown in FIG. 1) reaches the location of the optical sensor SE3. When the sensor SE3 detects the sheet at step D4, the program proceeds to step D5 where a control signal commanding the image sensor unit SHU to read the image for one line is delivered. At step D6, serial image data which is output from the image sensor unit SHU is delivered to the modem 240 for transmission over the communication channel. Upon completion of delivering data for one line, the program proceeds to step D8 where the stepping motor M1 is driven for rotation in the forward direction through one step. Unless the optical sensor SE3 fails to detect the sheet, the program returns to step D5 where an image for the next line is read and delivered.

At step D9, when the optical sensor SE3 fails to detect the sheet, this means that the entire original sheet has been read, the program proceeds to step D10 where the connection of the communication channel is interrupted. The buzzer is energized for an interval of three seconds (step D11), and the stepping motor M1 is driven for rotation in the forward direction through 40 steps to discharge the original sheet from the discharge port 17 (step D10). An interrupt operation is enabled, thus returning from an interrupt operation to the main routine.

Figure 9F:
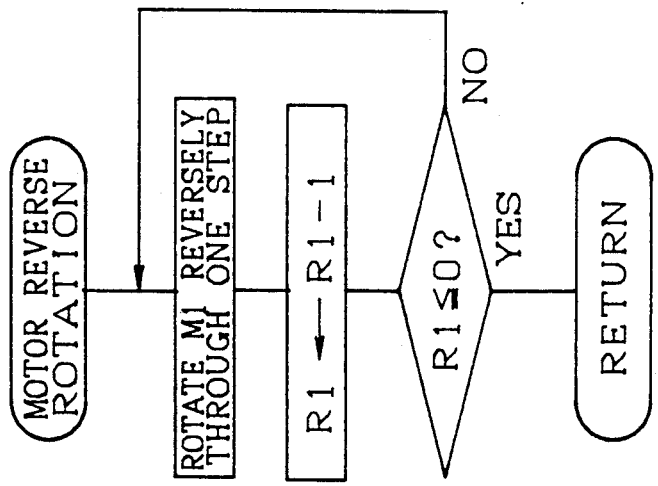
Figure 9E:
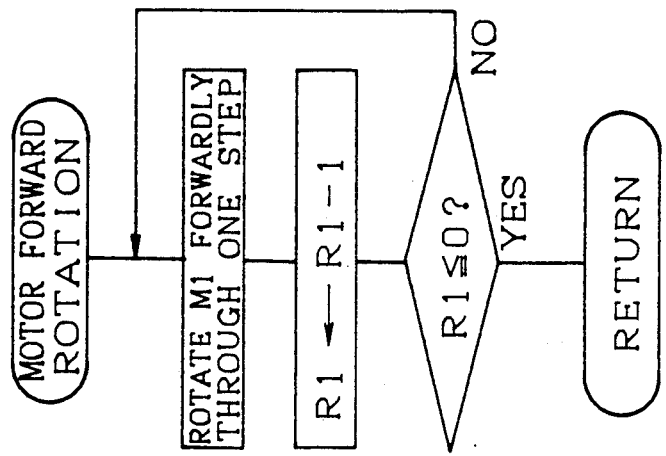

FIGS. 9e and 9f indicate subroutines in detail which are used to drive the motor for rotation in the forward direction and in the reverse direction, respectively.

In the described embodiment, it is assumed that the mating facsimile equipment comprises an existing facsimile equipment, but a reply operation can be further facilitated by partly modifying the operation of the mating facsimile equipment. By way of example, the facsimile equipment of the reservation center may be provided with a reply mode in which rather than interrupting the communication channel after the other or the onboard facsimile equipment has transmitted an original image, the facsimile equipment of the reservation center may be automatically switched to a receive mode to wait for a reply or the transmission of an image from the onboard facsimile equipment, whereupon the communication channel may be interrupted. This eliminates the need for the operators of the both facsimile equipments to exchange a conversation utilizing a telephone set or confirming a carrier tone in order to perform a switching between the transmission and reception, thus greatly simplifying the procedure than that shown in FIG. 8.

The above embodiment has been described when the arrangement of the invention is applied to making a seat reservation of New Tokaido Line, it will be seen that the arrangement simply returns a transmitted image as a reply operation to which information such as marks are added. Accordingly, the arrangement can be used without regard to the content of an image being transmitted, such as an order letter for goods, an enqute paper or the like, for example, without requiring any modification in the software and the hardware thereof. Thus, it will be seen that the arrangement exhibits a high versatility.

As described, the invention greatly simplifies a reply operation for image information. In particular, by providing a position entry board on tray means which is used in common as a discharge tray of a record paper and an original receptacle, any writing instrument which would otherwise be required in preparing a reply original can be dispensed with, thus removing the troublesome operation.

What is claimed is:

1. An image communication system comprising:
   channel connection means adapted to be connected with a communication channel;
   image recording means connected to said channel connection means for visually recording image information which is received through the channel connection means onto a first surface of a given sheet of recording paper;
   tray means for receiving and retaining said sheet on which an image is recorded by the image recording means;
   image reading means connected to said channel connection means for optically reading visual information on the given sheet for transmission through the channel connection means;
   reply switch means connected to said channel connection means for automatically setting up a conversation reserved mode while maintaining the communication channel connected after recording of an image by said image recording means;
   information entry means for providing reply information are connected to said image recording means to visually record reply information on said first surface of said sheet;
   conveyor means for conveying a sheet to and from said tray past said image recording means and said image reading means respectively;
   and electronic control means connected to said channel connection means, said information entry means, said image recording means and said conveying means for initiating conveying of the sheet on the tray means past the image reading means subsequent to recording of said reply information on said sheet to transmit the image information and the reply information through said channel connection means.

2. An image communication system according to claim 1 in which said conveying means includes conveying path changeover means which controls the direction in which the sheet is conveyed when receiving an image and when transmitting an image, the changeover means being operative to change the path along which the sheet is conveyed depending on the direction in which the sheet is conveyed.

3. An image communication system according to claim 1 wherein said information entry means includes contact means on the tray means representing a position on the tray means for output to the electronic control means.

4. An image communication system according to claim 3 in which the information entry means comprises electrode means disposed in a matrix form and defining electrical contacts at points of intersection which are opened or closed in response to a force of depression applied in the direction of the thickness thereof.

5. An image communication system according to claim 3 in which the electronic control means through the image recording means records the visual reply information in a given region which is centered about the position which is entered by the information entry means.

* * * * *